United States Patent
Zanotti

(10) Patent No.: US 10,636,135 B2
(45) Date of Patent: *Apr. 28, 2020

(54) METHOD FOR MONITORING THE RESPECT OF WELL-BEING OF LIVE POULTRY INTENDED FOR SLAUGHTER

(71) Applicant: Massimo Zanotti, Gussago (IT)

(72) Inventor: Massimo Zanotti, Gussago (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,502

(22) Filed: Jun. 24, 2019

(65) Prior Publication Data
US 2019/0311473 A1 Oct. 10, 2019

Related U.S. Application Data

(62) Division of application No. 14/609,679, filed on Jan. 30, 2015.

(30) Foreign Application Priority Data

Jan. 30, 2014 (IT) .............................. TO2014A0071

(51) Int. Cl.
| | | |
|---|---|---|
| A22B 7/00 | (2006.01) |
| G06T 7/00 | (2017.01) |
| A01K 29/00 | (2006.01) |
| A22B 3/00 | (2006.01) |
| A22B 3/08 | (2006.01) |
| H04N 7/18 | (2006.01) |

(52) U.S. Cl.
CPC ............ *G06T 7/0004* (2013.01); *A01K 29/00* (2013.01); *A22B 3/005* (2013.01); *A22B 3/086* (2013.01); *H04N 7/18* (2013.01)

(58) Field of Classification Search
CPC ........ A01K 29/00; A22B 3/086; A22B 3/005; H04N 7/18; G06T 7/0004
See application file for complete search history.

(56) References Cited

U.S. PATENT DOCUMENTS

| | | | |
|---|---|---|---|
| 5,037,351 A * | 8/1991 | Van Den Nieuwelaar ................... A22C 21/00 177/145 |
| 5,186,677 A * | 2/1993 | Christensen ............. A22B 1/00 452/53 |
| 5,962,806 A * | 10/1999 | Coakley .................. F42B 12/36 102/293 |
| 7,097,552 B2 * | 8/2006 | Ovesen .................... A22B 3/00 452/53 |

(Continued)

*Primary Examiner* — Philip P. Dang
(74) *Attorney, Agent, or Firm* — Thomas|Horstemeyer, LLP

(57) ABSTRACT

A method for monitoring live poultry intended for slaughter includes checking managing parameters and process parameters of poultry flocks from breeding farms, and monitoring transportation of the flocks to a slaughterhouse and handling thereof at the slaughterhouse. Gas stunning parameters of the poultry are checked prior to throat-cutting thereof. Video shooting of the poultry's reactions during the stunning step is done to visually verify a degree of well-being thereof. Computer records are made available wherein a single video file corresponds to each poultry flock or group of flocks in which images of the visible reactions of the poultry are combined and synchronized with said managing and process parameters.

14 Claims, 1 Drawing Sheet

(56) References Cited

U.S. PATENT DOCUMENTS

| | | | | |
|---|---|---|---|---|
| 7,448,943 B1* | 11/2008 | Woodford | ............... | A22B 3/005 |
| | | | | 452/66 |
| 8,029,342 B2* | 10/2011 | Anderson | ................ | A61D 7/04 |
| | | | | 452/66 |
| 2004/0241773 A1* | 12/2004 | Samadpour | .......... | A22B 5/0064 |
| | | | | 435/7.32 |
| 2007/0218064 A1* | 9/2007 | Benson | ................. | A61K 47/26 |
| | | | | 424/145.1 |
| 2009/0164234 A1* | 6/2009 | Sinn | ....................... | A01K 29/00 |
| | | | | 705/330 |
| 2013/0125835 A1* | 5/2013 | Sinn | ....................... | A01K 29/00 |
| | | | | 119/840 |

* cited by examiner

METHOD FOR MONITORING THE RESPECT OF WELL-BEING OF LIVE POULTRY INTENDED FOR SLAUGHTER

CROSS-REFERENCE TO RELATED APPLICATIONS

This application is a Divisional of U.S. patent application Ser. No. 14/609,679, filed Jan. 30, 2015, which claims the priority to IT TO2014A000071, filed Jan. 30, 2014, which are entirely incorporated herein by reference.

FIELD OF THE INVENTION

The present invention relates to the monitoring of live poultry intended for slaughter in view of verifying thereof the state of well-being between the breeding farm and throat-cutting at the slaughterhouse.

In the poultry world, and particularly in slaughterhouse establishments, systems to render the animals unconscious prior to throat-cutting are increasingly becoming adopted, and are based on the transit within environments with a modified atmosphere, having an increased concentration of $CO_2$, argon, nitrogen or others with reduced atmospheric pressure.

The European Directive EU 1099/2009 recently came into force, which lays down precise rules on how animals for slaughter should be treated, in compliance with a better criterion of "animal well-being".

In the section about poultry stunning systems with a modified atmosphere, it is required that monitoring is performed to verify the correct evolution of the stunning sequence.

The stunning procedure is essentially divided into two steps: before reaching a 40% $CO_2$ concentration and above the 40% threshold.

Before reaching the 40% threshold, the animals must already be unconsciousness and possibly show only some signs of convulsion.

The veterinary services which assist slaughterhouses must therefore have the opportunity to demonstrate compliance with the following:
1. Provision of a control service of the correct gas stunning steps to allow minimizing animal suffering.
2. Each animal is unconscious before crossing the threshold of 40%.
3. Recording of the gas concentration data at various points was performed with regularity and constancy.
4. General trend of the concentrations throughout the entire slaughter process.
5. Traceability of the entire situation is available for 12 months.
6. Ease of access to the consolidated data per consignment, as a basis for having a functional traceability.

STATE OF THE ART

Systems that control and manage the mechanical movement of the poultry, and the gas supply at the stunning step, act according to constant measurements and settings entered by the operators. This logic is normally managed by industrial PLCs, which carry out specific sequences of instructions. The measured data are shown on an HMI screen that the operator uses to determine which interventions to carry out: however, the recording capacities and availability of these data at the level of monitoring demonstration are fairly limited both regarding accessibility to the data and regarding storage capacity of historical records.

The major limitation encountered is that of relating together managing parameters, for example:
Flock number
Breeder name
Breeding site
Truck carrying out transportation
Animal breed
Animal age
Number of animals per cage with process parameters, for example:
Flock starting and ending time
Actual number of animals
Dead animals during transportation
Actual number of cages
Actual flock weight as well as with animal well-being parameters, for example:
Setting values of the stunning system Readings of the gas concentrations in the different areas
Setting values of the mechanical components of the stunning system
Reactions of the animals during the gas stunning step.

This last data can only come from a human observation, in real-time, carried out with the aid of a video camera, possibly able to move during the various stunning steps.

However, this visual check, even if properly executed by an operator, remains as disconnected information from all other data that are distributed throughout the system.

BRIEF DESCRIPTION OF THE DRAWING

The accompanying FIGURE shows an example of a video file produced in accordance with the method according to the invention, in which data relating to the management and process parameters are superimposed on an image indicative of the reactions of the chickens.

THE INVENTION

The object of the present invention is to provide a complete and efficient method for systematically monitoring the well-being of live poultry intended for slaughter, able to allow an immediate and easy consultation of the acquired data, expanding the possibility of being able to demonstrate compliance with the regulations.

According to the invention, this object is achieved thanks to a monitoring method, which envisages checking managing parameters and process parameters related to the identification of poultry flocks coming from breeding farms, to transportation thereof to the slaughterhouse and to handling thereof at the slaughterhouse, as well as checking gas stunning parameters of the poultry prior to throat-cutting, and wherein video shooting of the chickens' reactions during the stunning step is also envisaged, so as to visually verify the degree of well-being thereof, characterized in that it consists of making computer records available wherein a single video file corresponds to each poultry flock or group of flocks, in which the images of the visible reactions of the poultry are combined and synchronized with said managing and process parameters.

The invention therefore consists of the creation of a single video file in which it is possible to observe the animals of a specific consignment during the crossing steps of the gas tunnel of the stunning apparatus, with constant visibility of all the setting parameters of the apparatus and the relative real-time readings related to the flock of animals of which information is required. In this single video file, images of the visible reactions of the animals are synchronized with the setting and operation parameters, as well as with all the information that is required to irrefutably demonstrate that the prescribed monitoring was carried out, and that the entire system is managed properly.

Combining and synchronizing the managing and process parameters with the video images do not occur simultaneously to the shooting but subsequently, with the object of allowing the operator to first manage the production requirements, and then to run the video, to carry out any adjustments and re-run the video and to also insert the management and process parameters at a later moment. At the end of the day, the system carries out, on command, the synchronization of images with the re-checked and corrected management and process parameters, producing a new video with the management and process parameters superimposed on the images of the animals' reactions. This edited video no longer allows any changes.

To obtain this result, a protocol is used for communication between the video interface, the automation PLC(s) and an industrial processor (PC), which synchronizes all the various data and produces a video that shows, in a single synchronized document, the reactions of the animals in relation to the monitoring of the surrounding environment. This video file is automatically or manually stored in a computer file at each change of flock or consignment of animals, and can therefore be easily consulted and proposed as complete proof of the execution of the necessary checks.

The documented control can be carried out automatically or manually, as required, even several times per flock if there is a consignment with a particular difficulty.

The industrial PC uses a type of proprietary protocol, which creates a channel of continuous communication with the PLCs to which it is connected, and continuously records all the activity of the PLCs at every step.

The collection of data occurs at a rate, known as sampling frequency, variable in time according to the type of monitoring. This sampling frequency may be predetermined by a time interval parameter, or dynamically, that is, determined by a recognition algorithm of a weighted percentage change of the data to be recorded.

The management parameters and process parameters include or are selected from those listed above, as well as the parameters of well-being of the animals.

When there is a request for execution of a synchronized video document, the sampling by the PLC is intensified and synchronized with the images that are captured by the video camera in two possible ways: video shooting in a fixed position viewing several poultry-containing cages in succession, during the same stunning step, video shooting by tracking the same poultry-containing cage in several stunning steps.

The management and consultation software of the monitoring method according to the invention is stratified, and each layer is based on a different technology.

The predominant feature of this structure is the joining of "Linux-based" applications and "web-based" graphical interfaces. The latter, relatively new in the industry, enable the development of simple and quick-to-use interfaces, graphically appealing while also ensuring the possibility for equipping multiple existing PC workstations at the slaughterhouse for access to the software without installing any application whatsoever.

The method can be used via a browser of any kind, independently from the operating system used, and furthermore, a large part of the functionalities thereof can be carried out by a tablet or smartphone.

The method can also be used at different stunning steps to store information of the same consignment of animals from different steps, for example preceding steps, such as the loading at the breeding farm, transport times, transport temperatures, transport density and possibly thermography of the animals prior to entering the caging process, further expanding the possibilities for demonstrating the process carried out in compliance with the regulations by veterinarians.

The software is also conveniently equipped with data analysis algorithms, which allow detection of abnormal behavior, possible human errors or specific moments of the processing steps, and following these detections, send an informative communication to those in charge of the process.

Among the more interesting findings for diagnostic purposes are the following: gas leaks, interruption of the start or completion of the procedure, anomalies in the sensors, sudden changes of the parameters, anomalies in the distribution of the gas stratification gradient and recognition of an external climate situation to choose the most appropriate type of start-up sequence of the stunning system.

The invention claimed is:

1. A method for monitoring a respect of wellbeing of live poultry intended for slaughter the method comprising:
   checking managing parameters and process parameters related to identification of a poultry flock coming from a breeding farm,
   transporting the poultry flock to a slaughterhouse and handling the poultry flock at the slaughterhouse,
   checking stunning parameters of a poultry of the poultry flock prior to throat-cutting of the poultry, and
   video shooting of a reaction of the poultry during a stunning step, so as to visually verify a degree of well-being of the poultry,
   wherein the verifying includes making computer records available wherein a single video file corresponds to the poultry flock or a group of the poultry flocks in which images of the reaction of the poultry are combined and synchronized with said managing parameters and said process parameters,
   wherein the combining and synchronizing said images with said managing and process parameters is carried out at a later time than the video shooting,
   wherein said managing and process parameters include or are selected from one or more of flock identification, breeder's name, breeding site, truck carrying out transportation, animal breed, animal age, number of animals per cage, flock starting and ending time, actual number of animals, dead animals during transportation, actual number of cages, or actual flock weight, and
   wherein the video shooting is carried out by a movable video camera tracking the poultry of the poultry flock during several stunning steps.

2. The method according to claim 1, wherein said stunning parameters of the poultry include one or more of setting values of a stunning system, readings of gas concentrations in different areas of the stunning system, or setting values of mechanical components of the stunning system.

3. The method according to claim 1, wherein the verifying further consists of combining and synchronizing the checked stunning parameters with said managing parameters and said process parameters.

4. The method according to claim 2, wherein the verifying further consists of combining and synchronizing the checked stunning parameters with said managing parameters and said process parameters.

5. The method according to claim 1, wherein the verifying includes diagnosis for errors or anomalies in the stunning parameters.

6. The method according to claim 2, wherein the verifying includes diagnosis for errors or anomalies in the stunning parameters.

7. The method according to claim 3, wherein the verifying includes diagnosis for errors or anomalies in the stunning parameters.

8. The method according to claim 1, wherein the video shooting is further carried out by a fixed-position video camera viewing several poultry flocks in succession during the same stunning step.

9. The method according to claim 2, wherein the video shooting is further carried out by a fixed-position video camera viewing several poultry flocks in succession during the same stunning step.

10. The method according to claim 3, wherein the video shooting is further carried out by a fixed-position video camera viewing several poultry flocks in succession during the same stunning step.

11. A method for monitoring a respect of well-being of live poultry intended for slaughter the method comprising:
checking managing parameters and process parameters related to identification of a poultry flock coming from a breeding farm,
transporting the poultry flock to a slaughterhouse and handling the poultry flock at the slaughterhouse,
checking gas stunning parameters of a poultry of the poultry flock prior to throat-cutting of the poultry, and
video shooting a reaction of the poultry during a stunning step, so as to visually verify a degree of well-being of the poultry,
wherein the verifying includes making computer records available wherein a single video file corresponds to the poultry flock or a group of poultry flocks in which images of the reaction of the poultry are combined and synchronized with said managing parameters and said process parameters,
wherein said managing and process parameters include or are selected from flock identification, breeder's name, breeding site, truck carrying out transportation, animal breed, animal age, number of animals per cage, flock starting and ending time, actual number of animals, dead animals during transportation, actual number of cages, actual flock weight,
wherein said stunning parameters of the poultry include setting values of a stunning system, readings of gas concentrations in different areas of the stunning system, setting values of mechanical components of the stunning system, and
wherein the video shooting is carried out by a movable video camera tracking the poultry of the poultry flock during several stunning steps.

12. The method of claim 11, wherein the verifying further consists of combining and synchronizing the checked stunning parameters with said managing parameters and said process parameters.

13. The method of claim 11, wherein the verifying includes diagnosis for errors or anomalies in the stunning parameters.

14. The method of claim 12, wherein the verifying includes diagnosis for errors or anomalies in the stunning parameters.

* * * * *